United States Patent Office 2,823,987
Patented Feb. 18, 1958

2,823,987

NEW QUATERNARY SALTS

Richard J. Fielden, Ronald Frederick Homer, and Richard Lewis Jones, Manchester, England, assignors to Imperial Chemical Industries Limited, London, England, a corporation of Great Britain No Drawing. Application July 9, 1956
Serial No. 596,414

Claims priority, application Great Britain July 20, 1955

12 Claims. (Cl. 71—2.5)

This invention relates to new quaternary salts and more particularly it relates to new quaternary salts which possess useful herbicidal properties.

According to the invention we provide the said new quaternary salts which are of the formula:

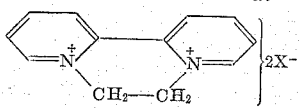

wherein X stands for an anionic radical, and which are obtainable by the processes stated hereinafter.

It is to be understood that the expression anionic radical includes such radicals derived from inorganic and organic acids and any such radical may be used herein. The said anionic radicals may be interchanged one with another without destroying the herbicidal activity of the products of this invention. As suitable anionic radicals there may be mentioned for example anionic radicals derived from inorganic acids for example halide radicals for example chloride, bromide and iodide radicals and anionic radicals derived from organic acids for example the p-toluenesulphonate radical.

According to a further feature of the invention we provide a process for the manufacture of the said new quaternary salts which comprises interaction of $\alpha:\alpha'$-dipyridyl and an ethylene glycol di-ester.

As a suitable ethylene glycol di-ester there may be mentioned for example an ethylene dihalide for example ethylene dibromide and an ethylene disulphonate for example ethylene di-p-toluenesulphonate.

The reaction may be carried out for example by heating the reagents together or they may be heated together in the presence of an inert solvent or diluent, preferably a high-boiling polar liquid, for example nitrobenzene or $\beta$-ethoxy-ethanol.

According to a further feature of the invention we provide a process for the manufacture of certain of the new quaternary salts of the invention which comprises interaction of a compound of the formula

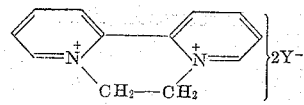

wherein Y stands for an anionic radical for example a bromide radical or a p-toluenesulphonate radical, and obtainable by the previously described process, with a salt of an acid derived from an anionic radical X, wherein X has the meaning stated above.

Thus those compounds of the formula given above wherein Y stands for halogen for example bromine can be converted into certain of the new quaternary salts of the invention by treatment with a salt for example sodium iodide or silver chloride. The said interaction may be carried out in the presence of an inert solvent or diluent medium for example water.

As particularly useful quaternary salts there may be mentioned for example those salts of the formula stated above wherein X stands for a bromide, chloride, iodide or p-toluenesulphonate radical.

The said new quaternary salts possess useful herbicidal properties. Thus according to a further feature of the invention we provide herbicidal compositions wherein the active herbicidal ingredient comprises one or more of the said new quaternary salts. Such compositions may be liquid compositions and may be for example aqueous solutions of the said new quaternary salts.

The said liquid compositions may advantageously contain auxiliary agents for example wetting agents and/or humectants. Suitable wetting agents may be for example alkali metal salts of dinaphthylmethane disulphonic acids for example sodium dinaphthylmethane disulphonates, alkali metal salts of long chain aliphatic sulphates for example sodium lauryl sulphate and condensation products of ethylene oxide with for example an alkyl phenol for example octylcresol such that the said condensation products contain about one molecular proportion of octylcresol condensed with about 8–10 moleculae proportions of ethylene oxide.

The humectant in the said liquid composition is beneficial in that for example it prevents evaporation of low volume sprays and it aids in the penetration of the active ingredient into the plant. Suitable humectants may be for example calcium chloride, glycerol, ethylene glycol and water soluble polyethylene glycols.

The said liquid compositions may also contain additional ingredients for example agents which improve the adhering properties of the said liquid compositions to the plant for example sodium carboxymethylcellulose and ammonium polymethacrylate.

The herbicidal compositions may also conveniently be in the form of solid compositions in which the new quaternary salts are admixed with inert pulverulent diluents for example talc, china clay, gypsum, basic slag, kieselguhr or bentonite and other colloidal clays.

The invention is illustrated but not limited by the following examples in which the parts are by weight:

Example 1

One part of 2:2'-dipyridyl and 10 parts of ethylene dibromide are mixed and the mixture is heated under reflux for 20 hours. It is then cooled and filtered and the solid residue is washed with acetone. It is then crystallised from aqueous methanol and there is obtained a quaternary bromide monohydrate which darkens above 300° C. and melts at 335°–340° C.

Example 2

1.6 parts of 2:2'-dipyridyl and 2.1 parts of ethylene dibromide are dissolved in 10 parts of nitrobenzene and the solution is boiled under reflux for 30 minutes. 20 parts of acetone are then added and the mixture is filtered and the solid residue is washed with acetone and crystallised from aqueous methanol. The product so obtained is identical with the material obtained according to the process of Example 1.

Example 3

2 parts of the product of Example 1 or Example 2 are dissolved in 8 parts of water and a solution of 5 parts of sodium iodide in 5 parts of water is added to the solution. The mixture is added to 30 parts of acetone and filtered. The solid residue of the quaternary iodide is washed with acetone and consists of orange needles which darken at 100° C. and melt with decomposition at 323° C.

Example 4

6.9 parts of the product of Example 1 or Example 2 are dissolved in 100 parts of water and 14.5 parts of freshly prepared silver chloride are added to the solution. The mixture is then stirred for 16 hours and filtered. The filtrate is evaporated and a solid residue of the quaternary chloride is obtained which melts with decomposition at 320° C.

*Example 5*

A mixture of 10 parts of 2:2'-dipyridyl and 28.5 parts of ethylene bis-p-toluenesulphonate is heated at 130°–140° C. for 4 hours. The reaction mixture is then ground with 100 parts of acetone and filtered. The solid residue is then dissolved in ethanol, the solution diluted with ether and the mixture so obtained is filtered. The solid residue is a quaternary p-toluenesulphonate, M. P. 235° C.

*Example 6*

A mixture of 36 parts of the quaternary salt from 2:2'-dipyridyl and ethylene dibromide, 3600 parts of water and 10 parts of a wetting agent comprising a polyethyleneoxy alkylphenol is applied, at the rate of 20 gallons to the acre, to a variety of plants. It is found that complete kill of, for example, wheat (*Triticum aestivum*), mustard (*Brassica alba*), marigold (*Calendula officinalis*), sugar beet (*Beta vulgaris*), red clover (*Trifolium repens*) and cleavers (*Galium aparine*) is obtained. When the 36 parts of quaternary salt used as starting material is replaced by an equivalent proportion of the corresponding quaternary chloride, iodide or p-toluenesulphonate a similar result is obtained.

*Example 7*

A 0.0625% aqueous solution of the quaternary salt obtained from 2:2'-dipyridyl and ethylene dibromide is applied, at the rate of 20 gallons to the acre, to plots of wheat, oats and barley containing a mixture of broad leaf weeds. It is found that complete kill of the broad leaf weeds is obtained with negligible damage to the wheat, oats or barley.

*Example 8*

A 0.5% aqueous solution of the quaternary salt obtained from 2:2'-dipyridyl and ethylene dibromide is applied at the rate of 20 gallons to the acre to a crop of potatoes. After about 10 days it is found that complete kill of the haulm is obtained. It is also found that the use of this 0.5% aqueous solution gives complete kill of the following annual weeds: fat hen (*Chenopodium alba*), orache (*Atriplex patula*), chickweed (*Stellaria media*), speedwell (*Veronica spp.*), grass (*Poa spp.*) and gives complete kill of shoots of the following perennial weeds: creeping thistle (*Cirsium arvense*), hawkweed (*Picris hieracioides*) and field convolvulus (*Convolvulus arvensis*).

*Example 9*

A dust containing 2 parts of the quaternary salt from 2:2'-dipyridyl and ethylene dibromide and 222 parts of china clay is applied at the rate of 2 hundredweights to the acre. It is found that the weeds are substantially controlled while the wheat crop suffers only negligible damage.

*Example 10*

A 2.5% aqueous solution of the quaternary salt from 2:2'-dipyridyl and ethylene dibromide is applied, at the rate of 20 gallons to the acre, to a mixed stand of brushwood. It is found that a high percentage kill of the aerial parts of bramble (*Rubus fructicosus*), wild rose (*Rosa canina*), hawthorn (*Crataegus oxycantha*), blackthorn (*Prunus spinosa*), elder (*Sambucus nigra*) and the suckers of elm (*Ulmus campestris*) is obtained.

What we claim is:

1. Quaternary salts which are of the formula:

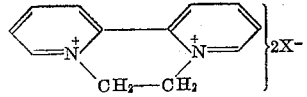

wherein X stands for an anionic radical.

2. Quaternary salts as claimed in claim 1 where the anionic radical is selected from the group consisting of a chloride, bromide, iodide and p-toluenesulphonate radicals.

3. Process for the manufacture of the quaternary salts claimed in claim 1 which comprises interaction of α:α'-dipyridyl and a quaternizing ethylene glycol di-ester.

4. Process as claimed in claim 3 wherein the reaction is carried out by heating the reagents together.

5. Process for the manufacture of certain of the quaternary salts claimed in claim 1 which comprises interaction of a compound of the formula:

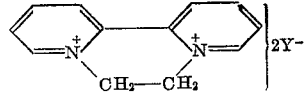

wherein Y stands for an anionic radical with a salt of an acid derived from an anionic radical X, wherein X has the meaning stated in claim 1.

6. Process as claimed in claim 5 wherein the salt of an acid derived from an anionic radical X is a silver salt.

7. Herbicidal compositions comprising, as the active herbicidal ingredient, at least one of the quaternary salts claimed in claim 1 and an inert carrier for said herbicidal ingredient.

8. Compositions as claimed in claim 7 wherein said carrier is a liquid carrier.

9. Compositions as claimed in claim 7 which are solid compositions wherein the quaternary salts are admixed with inert pulverulent diluents.

10. Process as claimed in claim 3 wherein the quaternizing ethylene glycol di-ester is an ethylene dihalide.

11. Process as claimed in claim 3 wherein the quaternizing ethylene glycol di-ester is an ethylene disulphonate.

12. Composition as claimed in claim 8 wherein said liquid carrier is water.

No references cited.